United States Patent [19]

Bohnsack et al.

[11] 4,057,511

[45] Nov. 8, 1977

[54] PROCESS FOR PREVENTING CORROSION AND THE FORMATION OF SCALE IN WATER CIRCULATING SYSTEM

[75] Inventors: Gerhard Bohnsack, Bergisch-Neukirchen; Hans Geffers; Herbert Kallfass, both of Cologne; Walter Radt, Leverkusen, all of Germany

[73] Assignee: Bayer Aktiengesellschaft, Leverkusen, Germany

[21] Appl. No.: 629,724

[22] Filed: Nov. 6, 1975

Related U.S. Application Data

[62] Division of Ser. No. 362,449, May 21, 1973, Pat. No. 3,933,427.

[30] Foreign Application Priority Data

May 26, 1972 Germany .............................. 2225645

[51] Int. Cl.$^2$ ...................... C23F 11/10; C23F 11/16
[52] U.S. Cl. .............................. 252/389 A; 21/2.5 A; 21/2.7 A; 106/14; 210/58; 252/8.55 E; 252/87; 252/181; 252/387
[58] Field of Search .................. 252/389 A, 181, 180, 252/87, 387, 8.55 E; 21/2.5 A, 2.7 A; 106/14; 210/58

[56] References Cited

U.S. PATENT DOCUMENTS

| 3,483,133 | 12/1969 | Hatch et al. ...................... 252/389 A |
| 3,510,436 | 5/1970 | Silverstein et al. .............. 252/389 A |
| 3,532,639 | 10/1970 | Hatch et al. ...................... 252/389 A |
| 3,714,066 | 1/1973 | King et al. ........................ 252/389 A |
| 3,723,347 | 3/1973 | Mitchell ........................... 252/389 A |
| 3,738,806 | 6/1973 | Feiler ............................... 252/389 A |

FOREIGN PATENT DOCUMENTS

1,282,078   7/1972   United Kingdom.

*Primary Examiner*—Benjamin R. Padgett
*Assistant Examiner*—Irwin Gluck
*Attorney, Agent, or Firm*—Burgess, Dinklage & Sprung

[57] ABSTRACT

Preventing corrosion and scale formation in water recirculating systems by adding to the water to be circulated from about 5 to 100 g/m$^3$, based on the weight of the water to be circulated, of a compound selected from the group consisting of those of the formula

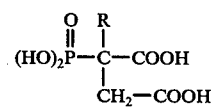

and the water-soluble salts thereof and then circulating said water in said system, R being hydrogen, alkyl, alkenyl or alkinyl having up to 4 carbon atoms; phenyl; cycloalkyl having 3 to 6 carbon atoms; benzyl; phenethyl or

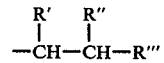

wherein R' is hydrogen, alkyl having 1 to 4 carbon atoms or carboxyl, R" is hydrogen or methyl and R'" is carboxyl.

3 Claims, 1 Drawing Figure

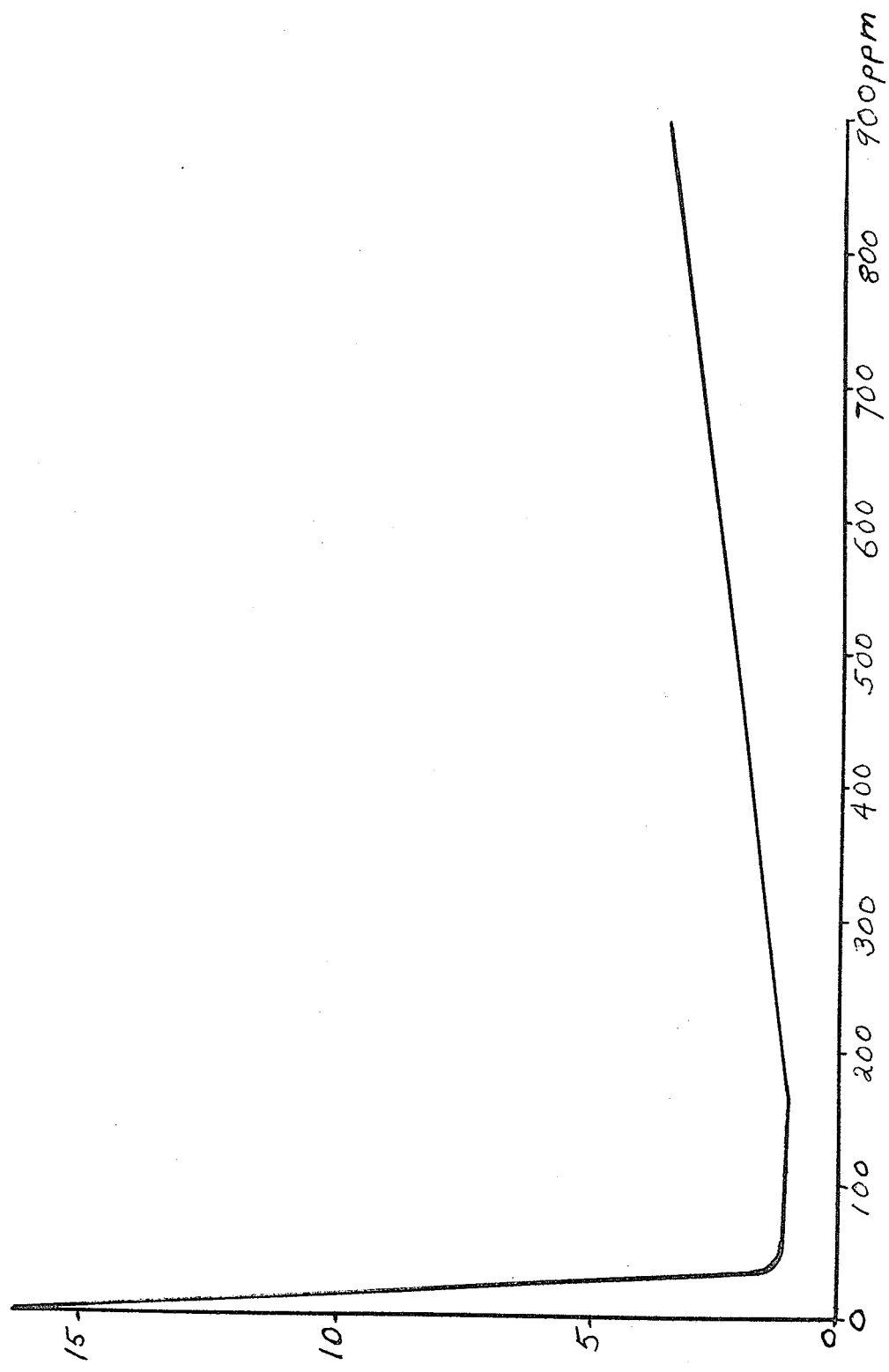

PROCESS FOR PREVENTING CORROSION AND THE FORMATION OF SCALE IN WATER CIRCULATING SYSTEM

This is a division of application Ser. No. 362,449, filed may 21, 1973, now U.S. Pat. No. 3,933,427.

This invention relates to a process for preventing both corrosion and the formation of scale in water-conducting systems which comprises adding a substance based on phosphonic carboxylic acid or its salts to the water.

The main problems arising in hydraulic engineering, e.g. when using untreated water for cooling purposes are the occurrence of corrosion and the formation of scale.

The corrosion of metals such as steel, aluminium, copper and alloys of these metals which are commonly used for water circulation tanks is mainly due to the action of oxygen and carbon dioxide dissolved in the water.

The prevention of corrosion by removing the oxygen, for example by the addition of hydrazine or sulphide, is impossible for economical and technical reasons in open cooling circuits, and corrosion inhibitors such as chromates or polyphosphates are therefore added to the cooling water.

Although chromates are, no doubt, very efficient corrosion inhibitors, their use is often undesirable since it often entails considerable disadvantages on account of their well known toxic effects.

The formation of scale in a cooling circuit, due mainly to the deposition of carbonates, sulphates, phosphates and hydroxides of calcium and magnesium on the heat transfer surfaces, impedes the transfer of heat in the heat exchangers and, therefore, reduces the efficiency of the plant.

Furthermore, the deposits of scale are liable to promote corrosion due to the formation of pockets of aeration.

Apart from the addition of corrosion inhibitors, polyphosphates have previously also been added to cooling water in order to prevent formation of scale. The action of the various polymeric phosphates consists in forming water-soluble complexes with calcium and magnesium which would otherwise harden the water. Also polyphosphates have a so-called threshold effect, that is to say when added in less than stoichiometric quantities they are capable of preventing the formation of a firm scale deposit by distrubing the growth of the crystal lattice.

Polyphosphates have, however, the serious disadvantage of being unstable at the temperatures at which they are employed and of readily hydrolysing to the orthophosphate which thus interferes with the protection against corrosion as well as soiling the circulating water by the inevitable formation of sludge. Another disadvantage of the phosphates is their property of promoting the growth of algae in the cooling circuit and having an undesirable eutrophic action on water.

We have now found a process for preventing corrosion and the formation of scale in water conducting systems, in particular in cooling water re-circulating systems which is characterised in that one or more phosphonocarboxylic acids or their water-soluble salts and optionally other corrosion inhibitors are added to the water.

Water-soluble salt means that the salt is soluble in water under the herein referred to application conditions. Such salts are preferably alkaline, alkaline earth, ammonium or zinc salts.

Phosphonocarboxylic acids are understood in the context of this invention to be those phosphonocarboxylic acids which contain more than one carboxyl group.

Phosphonocarboxylic acids which are suitable for the process according to the invention have the following general formula.

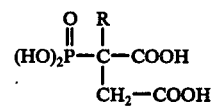

wherein
R represents a hydrogen atom, an optionally substituted alkyl, alkenyl or alkinyl group, in each case having up to 4 carbon atoms, an aryl, cycloalkyl or aralkyl group or the group

in which
R' represents hydrogen, an alkyl group having up to 4 carbon atoms or a carboxyl group;
R" represents hydrogen or methyl; and
R''' represents a carboxyl group.

These phosphonocarboxylic acids are particularly distinguished by their low phosphorus content combined with their high lime binding capacity compared with the conventional polyphosphates. Another important advantage is their resistance to hydrolysis and the thermostability of these phosphonocarboxylic acids compared with the usual polyphosphates, especially at high temperatures.

The following are specific examples of such phosphonocarboxylic acids:

α-Methyl-phosphonosuccinic acid;
Phosphonosuccinic acid;
1-Phosphonopropane-2,3-dicarboxylic acid; and
2-Phosphone-butane-tricarboxylic acid-(1,2,4).

The preparation of such phosphonocarboxylic acids has been described e.g. in German Offenlegungsschrift No. 2 015 068.

The quantity of phosphonocarboxylic acids or salts used may vary within wide limits but it is advisable to add about 5 to 100 g/m$^3$ of phosphonocarboxylic acid based on the water.

The action of the phosphonocarboxylic acids or their derivatives can be considerably improved by the addition of zinc salts, e.g. zinc sulphate, zinc phosphate, and/or phosphoric acid or phosphates which surprisingly have a distinct synergistic effect. Also any of the additives mentioned in H.O. Held, Kuhlwasser, Vulkan-Verlag, Essen, 1970, page 218 may be used.

The invention will now be explained more fully with the aid of the following specific examples. The phosphonocarboxylic acid mentioned there (phosphonobutanetricarboxylic acid) is particularly readily available. The accompanying FIGURE illustrates the inhibitory action of 2-phosphono-butane-tricarboxylic acid-(1,2,4) on carbon steel (St 35) in experiments carried out with stirrers (room temperature, pH 6.5 to 8.0).

The rate of corrosion is entered along the ordinate (in $g/m^2.d$)) and the quantity of phosphonocarboxylic acid used is entered along the abscissa (in ppm).

EXAMPLE 1

This example illustrates the inhibitory effect of 2-phosphonobutane-tricarboxylic acid-(1,2,4) on the corrosion of carbon steel St 35 (the steel used for cooling towers).

Sections of St 35 pipe which had been annealed under conditions of stress relief and pickled with hydrochloric acid before the experiment, were attached to a plastic stirrer and displaced at the rate of 0.63 m/s in tap water (total hardness 17.5° d, temporary hardness 7.5° d, 110 ppm $SO_4^{--}$, 185 ppm $Cl^-$, total salt content approximately 700 ppm) to which increasing quantities of 2-phosphonobutane-tricarboxylic acid-(1,2,4) were added. The experiment was carried out at room temperature. The pH of the water fluctuated in the range from 6.8 to 8.4. When the experiment had been carried out for 4 days, the test samples were again pickled and the total loss was determined. In the attached FIGURE, the weight loss of the pipe sections expressed in g $Fe/m^2.d$ is plotted against the concentration of 2-phosphonobutane-tricarboxylic acid-(1,2,4). The loss of Fe drops very sharply with increasing concentrations of inhibitor but rises again very slowly at concentrations above 160 ppm of 2-phosphono-butane-tricarboxylic acid-(1,2,4). The formation of the corresponding iron complex in the presence of oxygen is very noticeable here (see FIGURE).

EXAMPLE 2

In an experiment carried out as described in Example 1, the loss of Fe from St 35 steel in tap water which had not been treated with inhibitor was 15.97 $g/m^2.d$. The loss of Fe in the presence of 30 ppm of 2-phosphono-butane-tricarboxylic acid-(1,2,4) was 1.07 $g/m^2.d$ whereas if in addition 10 ppm of $Zn^{++}$ were added in the form of zinc sulphate, the rate of corrosion was reduced to 0.32 $g/m^2,d$.

When Zn was added alone in substantially the same quantity, the resulting effect was less marked. The loss of Fe by corrosion measured in this case was 11.99 $g/m^2.d$.

EXAMPLE 3

An additional synergistic effect is obtained by adding phosphate in the form of phosphoric acid or alkali metal phosphates to the combination of 2-phosphono-butane-tricarboxylic acid-(1,2,4) and zinc.

Under the experimental conditions described in the previous examples, a combination of 30 ppm of 2-phosphono-butane-tricarboxylic acid-(1,2,4) and 10 ppm of $Zn^{++}$ resulted in a loss of Fe by corrosion of 0.32 $g/m^2.d$. If in addition 10 ppm of $PO_4^{---}$ were added in the form of $H_3PO_4$, the weight loss of the pipe sections was only 0.024 $g/m^2.d$.

Preferred corrosion inhibitory compositions containing 10 to 60% by weight of the indicated phosphono-polycarboxylic acid or salt include 1 to 20% by weight of a Zn salt and 5 to 30% by weight of $H_3PO_4$, the total adding up to 100%.

It will be appreciated that the instant application and claims are set forth by way of illustration and not limitation, and that various modifications and changes may be made without departing from the spirit and scope of the present invention.

We claim:

1. A composition for preventing corrosion and the formation of scale in water-conducting systems which comprises by weight 1 to 20% of a Zn salt, 5 to 30% by weight of $H_3PO_4$, and the balance of a compound of the formula

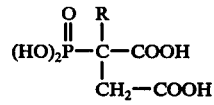

wherein R is hydrogen, alkyl, alkenyl, or alkinyl having up to 4 carbon atoms; phenyl; cycloalkyl having 3 to 6 carbon atoms; benzyl; phenethyl or

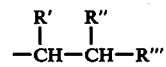

wherein R' is hydrogen, alkyl having 1 to 4 carbon atoms or carboxyl, R'' is hydrogen or methyl and R''' is carboxyl or a water soluble salt thereof.

2. The composition of claim 1 wherein the compound of said formula is zinc 2-phosphono-butane-tricarboxlic acid-(1,2,4).

3. The composition of claim 1 wherein the compound of said formula is 2-phosphono-butane-tricarboxylic acid-(1,2,4) or a water soluble base addition salt thereof.

* * * * *